United States Patent [19]

Rybak

[11] Patent Number: 4,999,875
[45] Date of Patent: Mar. 19, 1991

[54] ELASTOMERIC CAPS FOR VALVE HANDLES
[75] Inventor: Richard A. Rybak, Oldsmar, Fla.
[73] Assignee: Markers, Inc., Avon Lake, Ohio
[21] Appl. No.: 442,680
[22] Filed: Dec. 14, 1989
[51] Int. Cl.⁵ .............................................. A47B 95/02
[52] U.S. Cl. .................................. 16/117; 16/116 R; 74/558; 74/558.5; 74/553
[58] Field of Search ..................... 16/117, 118, 110 R, 16/DIG. 12, 19; 74/553, 557, 558.5
[56] References Cited
U.S. PATENT DOCUMENTS
4,165,659 8/1979 Fawley ................................... 74/558

FOREIGN PATENT DOCUMENTS
2100913 7/1972 Fed. Rep. of Germany ........ 16/117

Primary Examiner—Richard K. Seidel
Assistant Examiner—Patty E. Hong
Attorney, Agent, or Firm—Thomas M. Schmitz

[57] ABSTRACT

An elastomeric cap fitted to a circular valve handle of a fluid shut-off valve comprises a polygonal solid ring structure having an open center and containing a plurality of radially directed sockets molded in the ring structure. The sockets are adapted to engage circumferentially spaced peripheral lobes of the circular valve handle.

5 Claims, 3 Drawing Sheets

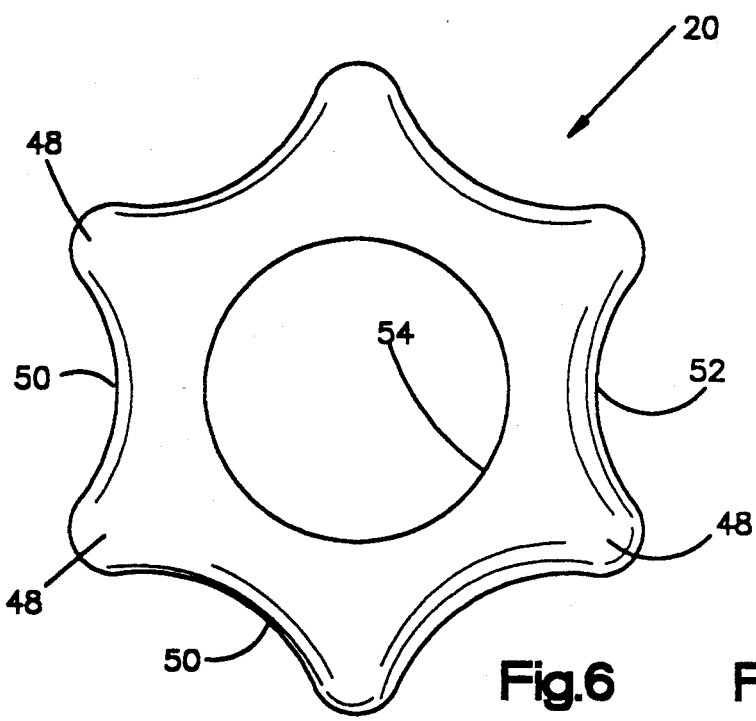
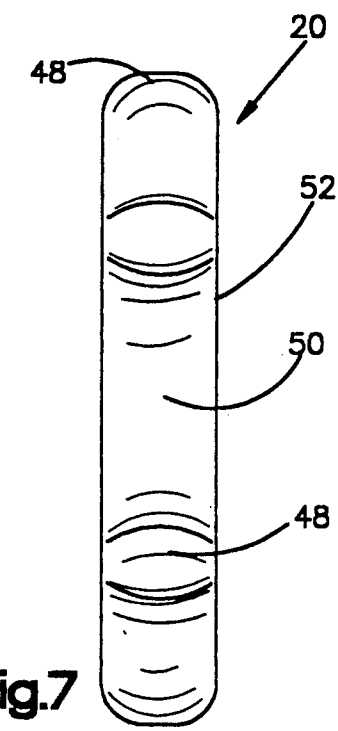
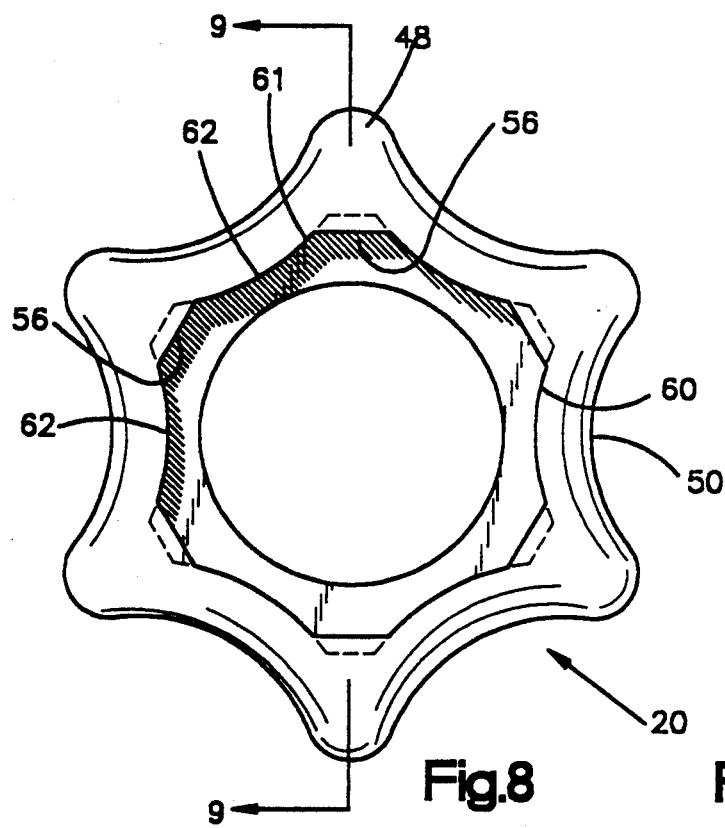
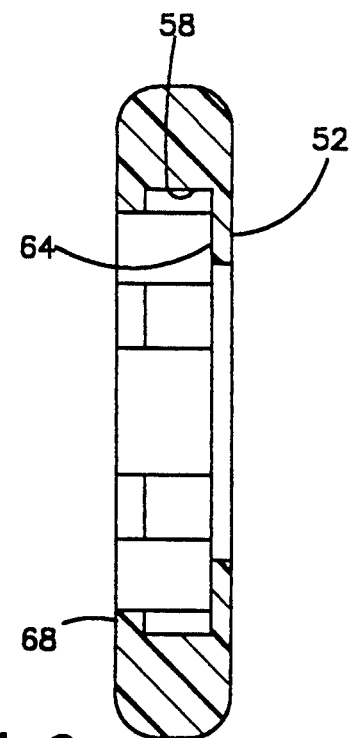

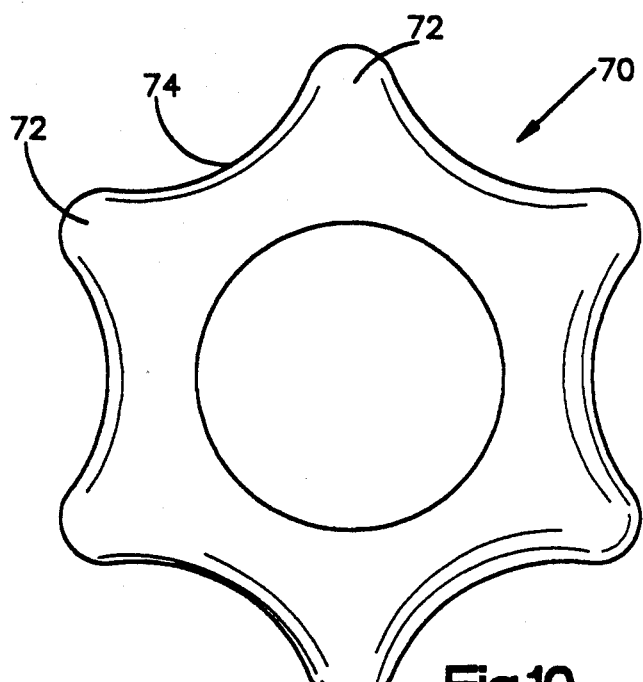
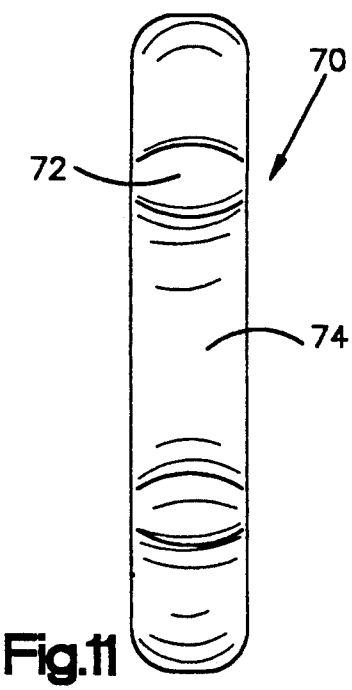
Fig.10  Fig.11
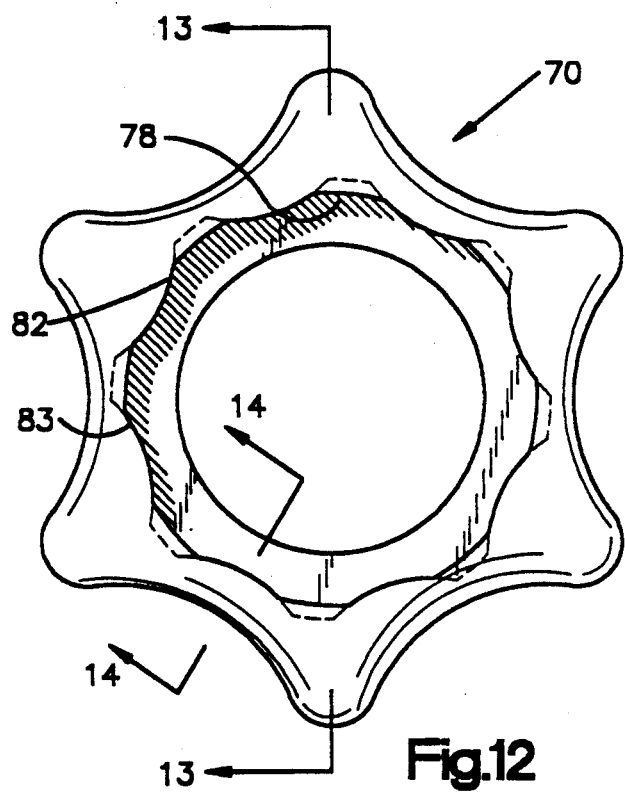
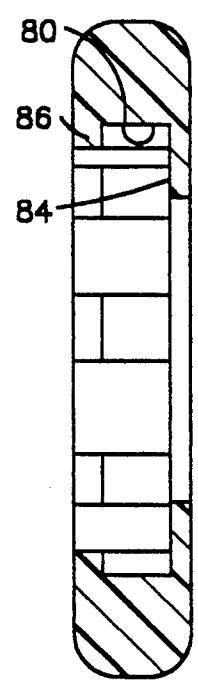
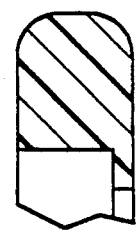
Fig.12  Fig.13  Fig.14

ELASTOMERIC CAPS FOR VALVE HANDLES

This invention pertains to valves for handling fluids including liquids and gases, and more particularly to elastomeric caps adapted to be snap-fitted onto shut-off valve handles to provide an enhanced gripping means for the handles.

BACKGROUND OF THE INVENTION

Fluid shut-off valves used in household water lines and gas lines, for example, ordinarily comprise a closing valve containing a closing mechanism operated by a small circular handle adapted to rotate to open or close the valve mechanism. Typical household handles ordinarily are two to three inch diameter circular handles, although copper plumbing valve handles can be somewhat smaller. The small metal pipe valves quite often stick or are otherwise difficult to open or close if not used often causing such handles to be difficult to grasp while rotating regardless if one's hands are small or large. Physical impairments such as arthritis substantially increase the difficult task of securely grasping the small valve handles. Most metal valve handles are made of stamped metal where the metal handles contain undesirable burs and sharp edges causing additional physical discomfort while grasping the small handles on shut-off valves.

It now has been found that a molded elastomeric cap adapted to be snap-fitted onto essentially circular, small valve handles for opening or closing shut off valves provide the shut-off valves with a comfortable gripping means to improve the hand grasp and to increase the gripping area while considerably increasing the mechanical advantage and applied torque to open or close the small valve handle. The molded elastomeric cap is generally polygonal in design having a discontinuous circular periphery comprising alternating protrusions circumferentially interspaced with flat indents to provide a comfortable and secure gripping structure within the palm and stretched fingers of a hand grasping the elastomeric cap. The internal construction of the elastomeric cap contains a plurality of snap-in portals or sockets adapted to physically engage the radially directed lobe structural configurations on the circular metal valve handles and thereby provide secure locking engagement between the elastomeric cap and the small circular handle while in use. The elastomeric cap eliminates uncomfortable burs and rough edges while providing a comfortable oversize gripping means to the valve handle. The elastomeric cap of this invention is particularly suitable for use with small circular valve handles having a diameter less than about three inches, typically about two inches, where such shut-off valves can be intermediate line shut-off valves or terminal faucet valves. The elastomeric caps can be molded from rubber or resilient plastic or other elastomeric materials and are particularly useful for steel handle valves although just as useful on copper plumbing valve handles or plastic valve handles. These and other advantages of this invention will become more apparent by referring to the drawings and detailed description of the invention.

SUMMARY OF THE INVENTION

Briefly, the elastomeric valve cap of this invention is adapted to be snap-fitted onto a circular valve handle operatively connected to a shut-off valve for controlling the flow of fluids. The elastomeric cap comprises a polygonal type configuration having an outer peripheral construction comprising circumferentially spaced, radial protrusions or nubs alternating with intermediate indents in combination with an internal molded construction containing a plurality of circumferentially spaced, radially directed internal sockets adapted to snap-fit in locking engagement with corresponding lobes on the circular valve handle.

BRIEF DESCRIPTION OF THE DRAWINGS

FIG. 6 is a front elevation view of the elastomeric cap in FIG. 2, adapted internally to snap-fit onto the six lobe circular valve handle shown in FIG. 5;

FIG. 7 is a side elevation view of the elastomeric cap shown in FIG. 6;

FIG. 8 is a rear elevation view of the elastomeric cap shown in FIG. 6;

FIG. 9 is a sectional view taken along lines 9—9 in FIG. 8;

FIG. 10 is a front elevation of the elastomeric cap in FIG. 2 adapted internally to snap-fit onto the eight lobe circular valve handle shown in FIG. 4;

FIG. 11 is a side elevation of the elastomeric cap shown in FIG. 10;

FIG. 12 is a rear elevation view of the elastomeric cap shown in FIG. 10;

FIG. 13 is a sectional view taken along lines 13—13 in FIG. 12; and

FIG. 14 is a partial sectional view taken along lines 14—14 in FIG. 12.

DETAILED DESCRIPTION OF THE INVENTION

Figure 1:
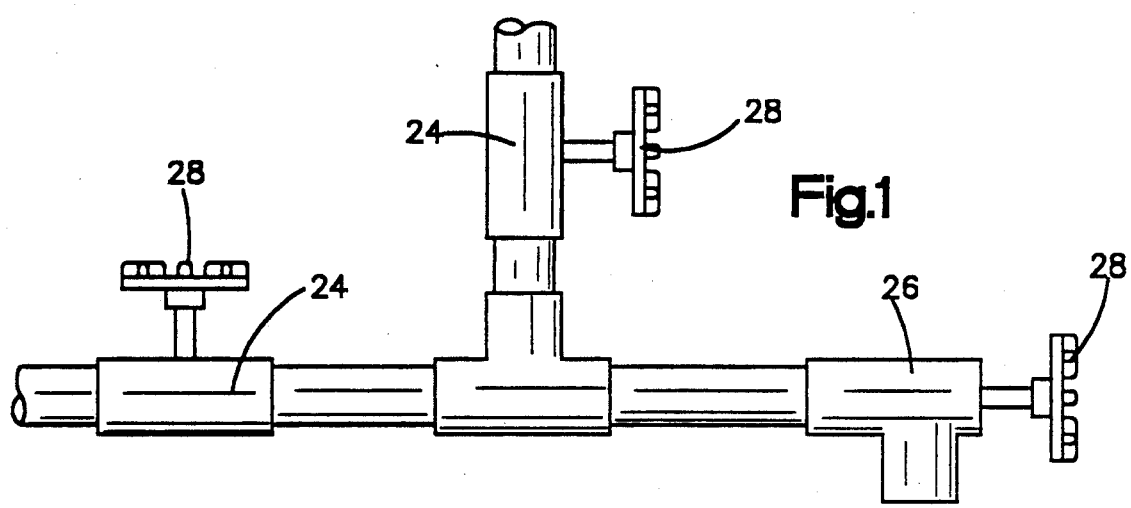
FIG. 1 is a pipe line drawing showing several shut-off valves.
Figure 2:
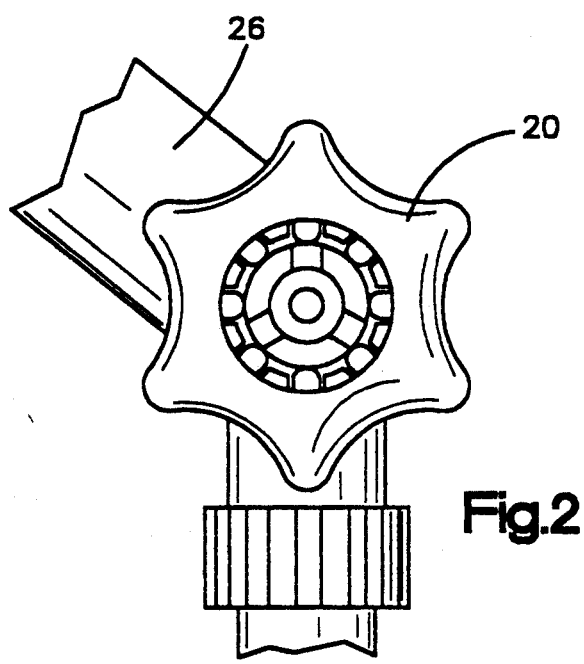
FIG. 2 is the terminal shut-off valve in FIG. 1 fitted with the elastomeric cap of this invention secured onto the valve handle.
Figure 3:
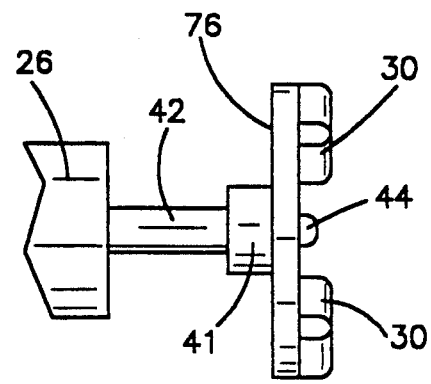
FIG. 3 is an enlarged, side elevation view of an eight lobe terminal shut-off valve.

Referring now to the drawings wherein like reference characters designate like parts, shown are several types of fluid shut-off valves for liquid or gas lines where the valves have circular valve handles fitted with an oversize elastomeric cap 20 in accordance with this invention.

Figure 4:
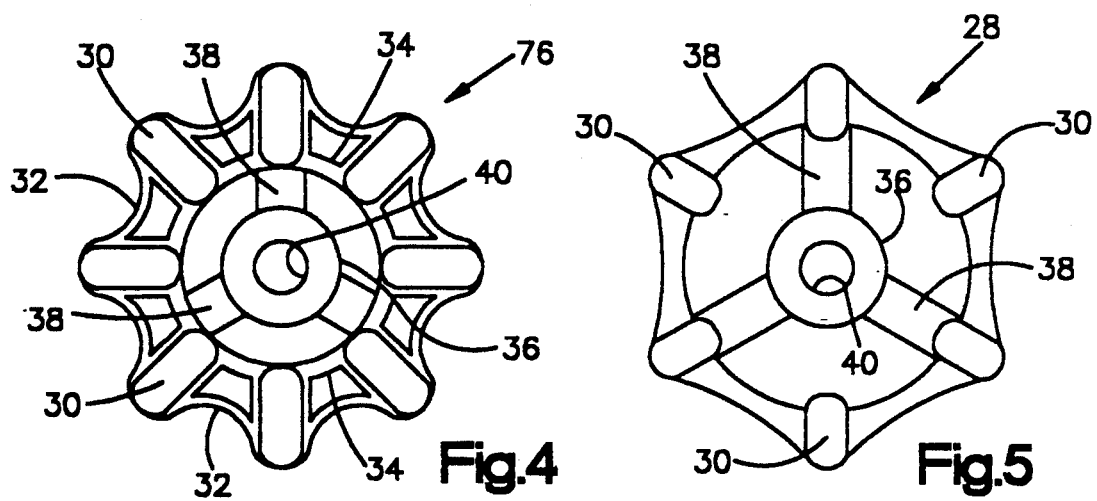
FIG. 4 is a front elevation view of the eight lobe circular valve handle shown in FIG. 3.
Figure 5:
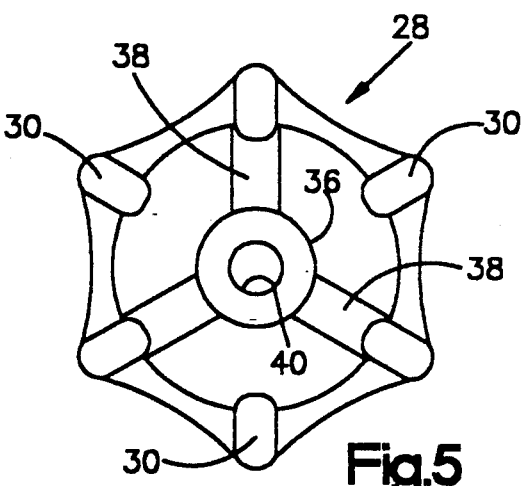
FIG. 5 is a front elevation view of a six lobe circular valve handle.

In FIG. 1, shown is a typical household pipe line 22 containing two internal shut-off valves 24 and a terminal shut-off valve 26 Where each valve 24, 26 contains a circular valve handle 28 (FIG. 5) or circular valve handle 76 (FIG. 4) comprising a plurality of radial lobes 30 circumferentially spaced along the outer periphery of the respective valve handle 28 or 76. In FIG. 4, the radial lobes 30 of an eight lobe handle are joined together by a series of exterior connectors 32 and a similarly non-continuous interior ring 34, where the radial lobe 30 construction is secured to a central disk 36 by a plurality of radial supports 38. The central disk 36 contains a central or axial opening 40 communicating with a housing 41 containing a square channel adapted to receive a similarly shaped valve stem 42 secured by a screw 44 passing through the opening 40. The valve stem 42 is operatively interconnected with shut-off valve 26 to open or close the valve 26, or can be similarly interconnected with an intermediate shut-off valve 24. In FIG. 5, the six-lobe handle is shown to be of simpler construction where lobes 30 are joined together by connectors, while a central disk 36 is secured thereto by radial supports 38. Hence, the circular valve handles 28 or 76 characteristically contain a plurality of circumferentially spaced, radial lobes or ribs 30, where most commercial valve handles contain eight radial lobes 30, as shown in FIG. 4, or six radial lobes 30, as shown in FIG. 5.

In accordance with the invention, the circular valve handle 28 or 76 is fitted with a snap-on, molded elastomeric cap 20 having a generally circular configuration with a solid, outer peripheral ring structure with an open center. The outer ring structure comprises an outer peripheral polygonal structure and preferably comprises a hexagonal-type structure. As viewed in FIGS. 6 and 10, the hexagonal elastomeric cap 20 contains six equidistant, circumferentially spaced, radially orientated peripheral protrusions 48 alternating with circumferentially orientated connecting indent structures 50. The protrusions 48 preferably are radially oriented and are interconnected with cord orientated indents 50, where the indents 50 are particularly adapted to be expediently gripped with the outstretched fingers while individual fingers are separated by the circumferentially spaced radial protrusions 48. The indents 50 preferably are concave or inwardly arcuate while the radial protrusions preferably are rounded points protruding outwardly. The top surface of the elastomeric cap 20 comprises a flat surface 52 shown to terminate inwardly in an internal circular opening 54, although the internal opening 54 can be any configuration or even continuous solid elastomeric material, if desired.

Referring now to FIGS. 8 and 9, shown is the interior construction of the elastomeric cap 20 adapted to be snap-fitted onto the six lobe circular valve handle 28 shown in FIG. 5. The elastomeric cap 20 generally comprises an open, hollowed out construction having six circumferentially spaced, radially orientated internal sockets 56 molded into the solid polygonal outer ring structure. As viewed in FIG. 8, each molded socket 56 in the hexagonal ring structure is preferably disposed in a corresponding radial protrusion 48 where each socket 56 is adapted to provide a snap-in engagement of the corresponding radial lobe 30 on the six-lobe circular valve handle 28. As viewed in FIG. 9, each socket 56 is defined by an outwardly arcuate rear wall 58 relative to the axial center of the elastomeric cap 20, where rear wall 58 interconnects to outwardly convex side walls 60, 61 (FIG. 8), where adjacent side walls of adjacent sockets 56 form an intermediate convex rounded nodule 62 separating adjacent sockets 56, and forming a part of the solid ring structure. As best viewed in FIG. 9, the upper wall 64 of each socket 56 is formed by the lower surface of the flat top surface 52 while the lower wall comprises a narrow bridge member 68 secured between side walls 60, 61 and further secured to the rear wall 58. Thus, each socket 56 is defined by rear wall 58, side walls 60, 61, upper wall 64, and lower bridge member 68, where each socket 56 is adapted to receive and provide snap-on locking engagement with a corresponding radially directed lobes 30 on circular handles 28. The elastomeric cap 20 can be fitted onto the circular valve handle 28 by inserting the handle 28 into the open rear side of the molded cap 20 and snapping the handle lobes 30 into corresponding sockets 56 of the elastomeric cap 20.

Referring next to FIGS. 10 through 14 inclusive, shown is a hexagonal ring structure, elastomeric cap 70 containing alternating radial protrusions 72 and intermediate indents 74 similar to elastomeric cap 20 previously described. Elastomeric cap 70 is adapted to snap-fit onto an eight lobe circular valve handle 76 shown in FIG. 4. As viewed in FIG. 12, the elastomeric cap 70 contains eight circumferentially spaced, radially directed sockets 78 equidistantly disposed within the molded outer ring structure of the elastomeric cap 70. Each socket 78 is defined, in a manner similar to sockets 56 disposed in the elastomeric cap 20, by an outwardly arcuate rear wall 80 with reference to the axial center of the elastomeric cap 70, and outwardly convex sidewalls 82 and 83 in combination with an upper wall 84 and a lower narrow bridge member 86. As best viewed in FIG. 12, the sockets 78 are circumferentially spaced equidistantly in the molded ring structure but are not necessarily disposed directly within a protrusion 72 as is the case with the six-lobe elastomeric cap 20 shown in FIG. 5. The eight sockets 78 are adapted to provide snap-fit engagement with an eight-lobe circular handle 76 whereby each lobe 30 is secured within a corresponding socket 78 by tight locking engagement between the upper wall 84 and lower bridge member 86 in conjunction with side walls 82, 83. It is readily seen that elastomeric caps can be produced for other multi-lobe circular valve handles although six-lobe and eight-lobe handles are the most common. The elastomeric caps 20 or 70 comprise resilient molded compounds and can be molded compositions of synthetic elastomer such as polyurethane or vulcanized rubber.

In use, the radial lobes 30 of either the six lobe circular handle 28 or the eight lobe circular handle 76 can be snap-fitted into a respective elastomeric cap 20 or 70 by slipping the open rear side of the elastomeric cap 20 or 70 over the circular handle 28 or 76 and snap fitting the lobes 30 into the corresponding sockets within the molded ring structure whereby each lower narrow bridge member provides secure locking engagement of each lobe within the socket in conjunction with the socket side walls and socket top wall. Easy removal of the elastomeric cap can be readily accomplished by bending the resilient elastomeric, molded ring structure axially outwardly and away from the valve handle, whereupon the narrow bridge member releases the engagement of each valve handle lobe and the elastomeric cap can be removed from the circular valve handle.

The merits of the invention are illustrated by the foregoing description and drawings but are not intended to be limiting except as defined by the appended claims.

I claim:

1. An elastomeric cap in combination with a circular shut-off valve handle having a plurality of circumferentially spaced radially directed lobes, the elastomeric cap comprising:

a polygonal, peripheral ring structure having an open axial center, where said ring structure contains circumferentially spaced peripheral protrusions intermediately connected by indents to provide a polygonal periphery ring structure adapted to be hand gripped; and the polygonal ring structure containing a plurality of radially directed internal sockets, each socket defined by a rear wall disposed in the polygonal ring structure, laterally spaced side walls connected to the rear wall, an upper surface, and a lower narrow bridge member secured to said side walls and said rear walls between said laterally spaced side walls, where the number of sockets is different than the number of protrusions where said sockets are circumferentially spaced equidistantly in the elastomeric ring structure but are not disposed directly within said protrusions of said elastomeric ring structure, where each said socket is adapted to engage a corresponding radially directed lobe of said circular valve handle where each socket lower bridge member maintains locking engagement of each said lobe of the valve handle within each corresponding socket.

2. The elastomeric cap of claim 1 where the polygonal ring structure comprises a hexagonal ring structure.

3. The elastomeric cap of claim 2 having eight sockets in combination with an eight-lobe circular valve handle.

4. An elastomeric cap in combination with a circular shut-off valve handle having a plurality of circumferentially spaced radially directed lobes, the elastomeric cap comprising:

a hexagonal, peripheral ring structure having an open axial center, where said ring structure contains six circumferentially spaced peripheral protrusions intermediately connected by indents to provide a hexagonal, elastomeric periphery ring structure adapted to be hand gripped; and said elastomeric ring structure containing a plurality of radially directed internal sockets, each socket defined by a rear wall disposed in the hexagonal ring structure, laterally spaced side walls connected to the rear wall, an upper surface, and a lower narrow bridge member secured to said side walls and said rear walls between said laterally spaced side walls, where said sockets are circumferentially spaced equidistantly within the hexagonal elastomeric ring structure but not disposed directly within protrusions of said elastomeric ring structure, where each said socket is adapted to engage a corresponding radially directed lobe of said circular valve handle, where each socket lower bridge member maintains locking engagement of each said lobe of the valve handle within each corresponding socket.

5. The elastomeric cap in claim 4 containing eight sockets.

* * * * *